June 2, 1936.  W. GENSECKE  2,042,711
APPARATUS FOR TREATING OILS AND FATS
Filed Feb. 7, 1934
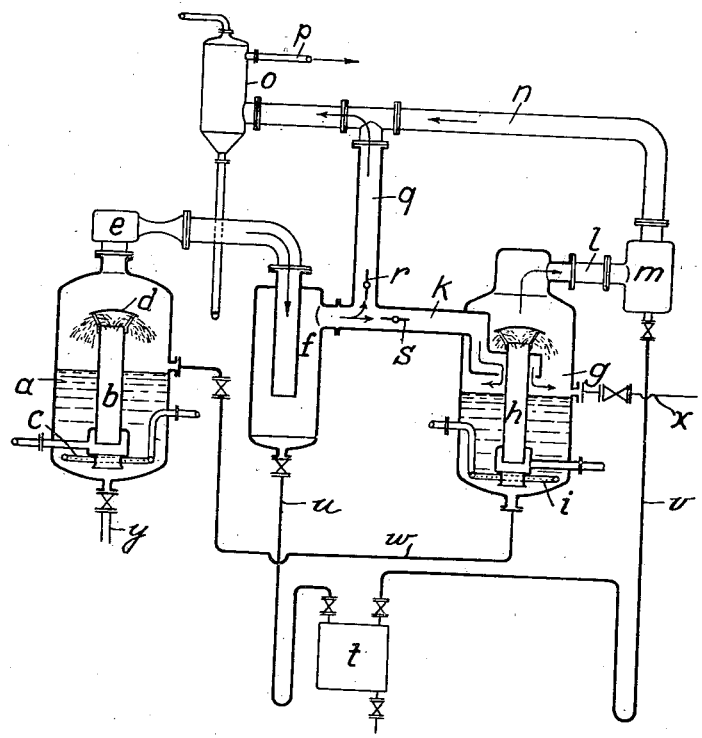
Inventor:
Wilhelm Gensecke,
By Potter, Pierce & Scheffler,
Attorneys.

Patented June 2, 1936

2,042,711

UNITED STATES PATENT OFFICE 2,042,711

APPARATUS FOR TREATING OILS AND FATS

Wilhelm Gensecke, Gonzenheim, near Frankfort-on-the-Main, Germany, assignor to American Lurgi Corporation, New York, N. Y., a corporation of New York Application February 7, 1934, Serial No. 710,192
In Germany February 17, 1933

2 Claims. (Cl. 202—205)

This invention relates to an apparatus for the simultaneous elimination of substances causing smell and taste, and of volatile acids, from oils and fats by means of steam.

It is known to eliminate substances that cause smell and taste from oils and fats by passing steam at sufficiently high temperature through the materials under treatment. As a rule the treatment is performed in vacuo, and it has been found to be of particular advantage to employ a very high vacuum, generated by a steam injector arranged between the still and the condenser for the steam.

For greater economy, the steam issuing from the injector has been utilized, prior to its entry into the condenser, for pre-distillation in a special still for that purpose, the consumption of steam being thereby considerably reduced.

Lately, the users of deodorizing plants have, in some instances, wished to be in a position to distil off any small quantities of fatty acids that may still be present in the oils or fats to be deodorized—for example, such quantities of fatty acids as have been formed, after the neutralization treatment, in the course of, for example, bleaching or hardening—in order to avoid the necessity for a secondary neutralization by means of saponification with alkali. The distillation of such fatty acids is effected the more easily in proportion as the temperature and vacuum are increased, and the larger the quantity of steam that is passed through the oil.

If, in such cases, recourse be had to the most economical system, the repeated utilization of the steam, the inconvenience arises that the fatty acids distilling over during the final distillation, pass, together with the steam and other volatile substances, into the pre-distillation apparatus, in which the fatty acids, which condense already at a high temperature, are more or less completely absorbed by the oil.

The problem therefore arises of separating the small quantities of distilled fatty acids from the accompanying steam before reaching the pre-distillation apparatus. Practical experience has shown that separators, which, as is known, were provided, for this purpose, between the final still and an injector feeding the pre-distillation apparatus, performed their functions in an incomplete manner only, particularly in dealing with the treatment of hardened oils.

It has now been unexpectedly ascertained in accordance with the present invention that the separation of the fatty acids from the distillation steam can be effected to a satisfactory extent by locating the separator to the rear of the steam injector, that is to say, between the injector and the pre-distillation apparatus. The explanation of this fact appears to be that, in the transformation of energy in the diffuser of the steam injector, the temperature undergoes a considerable reduction in places—sometimes down to 0° C.—and that, through the intimate mixing of the steam and the fatty-acid vapours, complete condensation of the fatty acids takes place in the diffuser, so that, beyond the injector, only mechanical separation is required.

The present invention therefore consists essentially in the provision of a separator or condenser between the steam injector and the pre-distillation apparatus, in deodorizing plants with multiple utilization of steam, and in which a high vacuum is generated, in the final still, by the action of a steam injector.

In order more clearly to understand the invention, reference is made to the accompanying drawing, which illustrates diagrammatically and by way of example, one embodiment of apparatus suitable for carrying the invention into practical effect.

In said drawing, $a$ is the still, which is heated in the known manner and in which the final treatment is effected. The steam employed for the distillation is admitted through the perforated coil $c$ and circulation pipe $b$. In the upper part of the still $a$ is a bell-shaped member $d$, the function of which is to deflect any mechanically transported particles of liquid. The vapors leaving the distiller $a$ are forwarded, by the injector $e$, into the intermediate separator or condenser $f$, in which the fatty acids are separated from the steam. If necessary, the vessel $f$ may also be equipped with means for cooling with air or water, which, of course, must be so designed that no substantial quantities of steam are condensed in $f$. The vapours then pass through the pipe $k$ into the predistillation apparatus $g$, into which steam for agitation and circulation is also introduced, directly, by way of the perforated coil $i$ and upcast pipe $h$. The still $g$ is connected, through the pipe $l$, with a separator $m$, and with the further pipe $n$ provided with the condenser $o$ for the steam. This condenser is evacuated through the pipe $p$, which is connected with an evacuator (not shown) of any convenient type. If it should not be desired to pass the whole of the vapours, issuing from $f$, into the pre-distillation apparatus, the surplus quantity can be led off through a branch pipe $q$, the relative proportions passing through $q$ and $k$ being controlled, as desired, by the valves $r$ and $s$. $t$ is a receiver which, through the intervention of appropriate valved conduits $u$ and $v$, collects all the substances deposited in the several separators. The still $g$ may be heated in the same manner as the still $a$. Reference character $w$ represents a valved conduit communicating between stills $g$ and $a$ for the transfer from the one to the other of liquid undergoing treatment.

It is, of course, to be understood that still $g$ is to be provided with inlet means, as at $x$, for introduction thereinto of liquid to be treated, and that still $a$ is provided with discharge means, as at $y$, for withdrawal of treated liquid.

I claim:—

1. Apparatus for deodorizing oils and fats and simultaneously distilling off small quantities of free fatty acids, comprising a still, a separator, and an injector located between and communicating with said still and said separator, an initial still located beyond said separator, a conduit communicating between said initial still and said separator, a vapor condenser, a conduit communicating between said initial still and said condenser and means for transferring liquid from said initial still to said first-named still.

2. Apparatus for deodorizing oils and fats and simultaneously distilling off small quantities of free fatty acids, comprising a still, a separator, and an injector located between said still and said separator, an initial still located beyond said separator, a conduit communicating between said initial still and said separator, a vapor condenser, a conduit communicating between said initial still and said condenser, means defining a passageway communicating between the two conduits aforesaid, said last named means being provided with means defining the available area of said passageway, and means for transferring liquid from said initial still to said first-named still.

WILHELM GENSECKE.